United States Patent
Accomando et al.

(10) Patent No.: US 9,416,029 B2
(45) Date of Patent: Aug. 16, 2016

(54) COMPACT BIOCIDAL WATER PURIFICATION SYSTEM

(71) Applicant: Gamma Research Technologies, LLC, Colts Neck, NJ (US)

(72) Inventors: Salvatore Paul Accomando, Rockville Centre, NY (US); Arthur Brook Crossan, III, Colts Neck, NJ (US); Ralph Leonard Hensler, New York, NY (US); Michael Robert Kovalevich, Jr., Bangor, PA (US)

(73) Assignee: Gamma Research Technologies, LLC, Colts Neck, NJ (US)

( * ) Notice: Subject to any disclaimer, the term of this patent is extended or adjusted under 35 U.S.C. 154(b) by 186 days.

(21) Appl. No.: 14/276,029

(22) Filed: May 13, 2014

(65) Prior Publication Data

US 2014/0339147 A1 Nov. 20, 2014

Related U.S. Application Data

(60) Provisional application No. 61/855,362, filed on May 14, 2013.

(51) Int. Cl.
*C02F 1/30* (2006.01)
*C02F 1/28* (2006.01)
*C02F 1/00* (2006.01)

(52) U.S. Cl.
CPC ............. *C02F 1/305* (2013.01); *C02F 1/001* (2013.01); *C02F 1/283* (2013.01); *C02F 2301/028* (2013.01)

(58) Field of Classification Search
CPC .......... C02F 1/305; C02F 1/283; C02F 1/001; C02F 2301/028; C02F 1/30; C02F 1/28
See application file for complete search history.

(56) References Cited

U.S. PATENT DOCUMENTS

| | | | |
|---|---|---|---|
| 2,968,734 A | 1/1961 | Yeomans |
| 3,264,473 A | 8/1966 | Levin et al. |
| 3,434,467 A | 3/1969 | Anderson et al. |
| 3,505,991 A | 4/1970 | Hellerstein et al. |
| 3,602,712 A | 8/1971 | Mann et al. |
| 3,603,788 A | 9/1971 | Miraldi et al. |
| 3,683,183 A | 8/1972 | Vizzini et al. |
| 3,767,918 A | 10/1973 | Graybeal |
| 3,836,781 A | 9/1974 | Ellison |
| 3,865,734 A | 2/1975 | Woodbridge |
| 3,889,123 A | 6/1975 | Bosshard |
| 3,904,882 A | 9/1975 | Lund et al. |
| 3,927,325 A | 12/1975 | Hungate et al. |
| 3,952,202 A | 4/1976 | Bosshard |
| 4,020,352 A | 4/1977 | Mahler et al. |
| 4,144,456 A | 3/1979 | Bosshard |

(Continued)

*Primary Examiner* — Walter D Griffin
*Assistant Examiner* — Cameron J Allen
(74) *Attorney, Agent, or Firm* — Duane Morris LLP (57) ABSTRACT

A biocidal water purification apparatus exposes water to radiation to eliminate viable species. A housing forms a path for water to flow from an inlet to an outlet along a flow path through a treatment zone at which the water is subjected to radiation from a source of radiation, such as beta particles from strontium-90. The exposure to radiation is enhanced using a narrow water flow path lined with the source, especially on oppositely interleaved plates with triangular cross sections, spaced by about 0.25 inch to produce an elongated zigzag path traversed by the water, for example by vertical gravity feed. Additional aspects include other forms of radiation and pre- and post-treatment water treatment or filtration stages and alternatives for continuous, batch and timed-residence water flow management.

20 Claims, 7 Drawing Sheets

(56) References Cited

U.S. PATENT DOCUMENTS

| | | | |
|---|---|---|---|
| 4,265,747 A | * | 5/1981 | Copa .................. A61L 2/14 210/758 |
| 4,464,330 A | | 8/1984 | Speir et al. |
| 5,250,257 A | | 10/1993 | Lengfelder |
| 5,512,253 A | | 4/1996 | Woodbridge et al. |
| 5,541,096 A | * | 7/1996 | Nomura .................. B01J 19/123 210/601 |
| 5,669,221 A | | 9/1997 | LeBleu et al. |
| 5,845,504 A | | 12/1998 | LeBleu |
| 6,058,718 A | | 5/2000 | Forsberg et al. |
| 6,182,453 B1 | | 2/2001 | Forsberg |
| 7,442,312 B2 | | 10/2008 | Taghipou |
| 8,043,511 B2 | * | 10/2011 | Holland .................. C02F 1/487 204/155 |
| 2005/0167368 A1 | | 8/2005 | Gehringer et al. |
| 2011/0049394 A1 | | 3/2011 | de Rochemont |

* cited by examiner

COMPACT BIOCIDAL WATER PURIFICATION SYSTEM

CROSS REFERENCE TO RELATED APPLICATION

This application claims the priority of U.S. provisional application Ser. No. 61/855,362, filed May 14, 2013, which is hereby incorporated in its entirety.

BACKGROUND

This disclosure relates to the field of water purification, and in particular provides a biocidal water purification method and apparatus configured to apply ionizing radiation to a flow of water at close range.

Rendering water fit for human consumption for purposes of ingestion, but also for washing and cooking, may involve treatment to eliminate biological contaminants and pathogens. The water treatment steps that need to be undertaken vary with the content of the source water to be treated. For example, fresh water from a spring or stream needs less extensive treatment than water that has been compromised by flood or sewage. But even seemingly clean fresh water, especially from streams or rivers or from sources that may have been flooded, may be compromised by suspended particles, parasites, bacteria, algae, viruses, fungi and the like, often as a result of a failure of human sanitation. These pathogens and parasites are responsible for various water borne diarrheal and other illnesses.

A complete municipal water purification plant is capable of eliminating chemical and biological threats. Chemical reaction with particular reagents such as flocculation agents, followed by skimming and sedimentation, filtration to remove undissolved solids, ultra filtration and/or reverse osmosis filtration to remove dissolved solids (salts), and chlorination to preserve the treated water are all known. But a complete and operational water purification plant may not be available or feasible, in which case a smaller, and even portable, water purification apparatus is useful.

The physical and chemical facilities needed for municipal water treatment may be substantial and complex, having large fixed installations with ponds, tanks, pumps, filtration beds, skimmers, backwashes, controls, etc. A challenge is presented to accomplish similar treatment steps in a compact unit. In the case of porous media or reverse osmosis filtration, electric power is needed to develop a sufficient pressure head. Chemical water treatment process steps that might be considered as candidates, such as ozonation (sparging with ozone gas), chlorination at concentration sufficient to oxidize organic molecules, and similar water treatment processes may employ strong chemicals that would be unmanageable in a small water treatment unit intended to be portable and safe. Chemicals with high oxidation potential are likely to be unhealthful for human exposure.

With respect to ozonation, for example, the technique is to expose treatment water temporarily to ozone gas and to collect the excess ozone reagent. But ozone is corrosive and is considered poisonous. Leaks carry a risk of fire. Ozone and other elements and compounds that act as biocides, or that degrade organic molecules, may be poisonous to humans or have high oxidation potentials making them dangerous or difficult to store and handle. Even if safely handled, such chemicals may produce undesirable reaction products when certain compositions are present in the treatment water.

A small water purification system is desirable for applications that require a small processing capacity. An advantageous system would be lightweight, compact and portable. If used for processing relatively fresh water from a natural source such as a stream or body of water, the processing can be limited to pore filtration and a biocidal treatment. The biocidal treatment eliminates the viability of pathogens (microbes, viruses, bacteria, bacterial or fungal spores, parasites and the like).

Devices that emit UV light in a particular frequency range are also used for biocidal treatment of water. The frequency is chosen to optimize the destruction of chemical bonds in proteins and DNA molecules within the target organisms in the water. UV treatment also requires considerable electrical power and equipment to achieve the required kill levels.

Electron-beam radiation is a form of ionizing energy. The beam, is a concentrated, stream of electrons, accelerated by a high voltage source to energy levels in the MeV range. The electrons strike a target and produce high flux levels of x-rays primarily from the bremsstrahlung process. E-beam systems are now perceived as a cost-effective means for biocidal treatment of waste and municipal water. Like UV sources the objective is to have the x-rays break chemical bonds in the target organisms. The apparatus is energy intensive, subject to routine repair, and is complex.

It would be advantageous to provide a water treatment apparatus and technique that is at or near 100% biocidal in one exposure step, that also degrades or eliminates even non-viable organic compounds that might lead to immunologic or allergenic reactions, that is small, safe, does not use electric power, can be operated easily without extensive training, and does not involve adding strong or possibly noxious chemicals to the water.

Solutions are needed for water treatment, in particular to provide a biocidal water treatment step in an apparatus that can be compact, lightweight, low or zero in requirements for electrical power, and devoid of chemicals that are poisonous or have high oxidation potentials.

SUMMARY

An object of this disclosure is a biocidal water treatment process that uses ionizing radiation to destroy pathogens in water from a source. The basic design requires water to flow along a path, wherein the ionizing radiation is emitted by a radioactive isotope that lines the water flow path, or is immediately adjacent to the water flow path. It is a further object to provide an apparatus for applying such ionizing radiation wherein the incident radiation integrated over the path of water through the apparatus is effective, i.e., robustly biocidal, but where the apparatus isolates the radiation from humans that are nearby the apparatus, such as those operating the unit or having access to the unit to obtain water. In an exemplary embodiment, the source of the radiation is a radioactive isotope to emit beta particles (high energy electrons), such as strontium 90. The radioactive source is disposed on opposite sides of a narrow and circuitous water flow path. In an embodiment, oppositely-oriented closely spaced plates of triangular cross section are configured to interleave with one another such that the faces of adjacent plates are parallel and closely spaced. The spaces between the plates define a narrow flow path for water being treated and can be, for example a width about 0.25 inches or less between the plate surfaces. This geometry enhances the exposure dose in the water over the length of its passage through the apparatus, compared to a wider passage.

The water flow path can be sequential through successively encountered spaces between all the interleaved sheets spaces in a housing, for example proceeding serially in a zigzag path from top to bottom of a housing wherein plates with triangular cross section are mounted to protrude laterally inwardly from opposite sidewalls so as to interleave. Alternatively, two or more sections can be defined such that two parallel paths are presented. The flow rate of the water is adjusted so that the exposure of the water to ionizing beta particle radiation, as integrated over the residence time of the water between the beta particle emitting plates, is sufficient to kill any live biological species and to render non-viable any viruses, or bacterial or fungal spores.

Beta particles are high energy electrons emitted by a radioactive source. The beta particles lose energy at a linear rate with distance. The rate is proportional to the atomic number and density of the material through which the beta particles pass. Beta particles lose energy by electromagnetically interacting with electrons and nuclei in the surrounding material. This slows the beta particles down. The rate of energy loss is referred to as the stopping power of the material. For water, for example, all of the energy of a 2 Mev beta particle is absorbed within about 1 cm of travel.

The present water treatment apparatus can be externally encased in metal sheet material having a low atomic number, such as aluminum, to shield persons in the area of the apparatus from exposure to beta particle radiation. Although beta particles can be easily stopped by thin layers of a metal shield material it is advantageous to initially have the beta particles pass through a layer of a material with a low atomic number, followed lead or steel so as to minimize the production of bremsstrahlung x-ray radiation with the shield material.

In an exemplary embodiment, the biocidal element defined by the interleaved plates is preceded and followed along the flow path by additional water treatment filters, which can easily be changed as needed. An initial filter is configured to slide out of the device so that sediment can be removed, and a subsequent, preferably-final filter clarifies and deodorizes the water, for example by exposure to activated charcoal. This embodiment is advantageously light in weight and may be sized to be portable or provided in modules that can be connected in series or parallel to obtain the desired flow rate throughput with adequate biocidal effect.

In an alternative embodiment, more lethal radiation can be applied to the water, i.e., from a source such as a gamma ray source. Depending on the energy of the gamma ray, the gamma radiation can produce ionization at greater range than a beta particle. This embodiment has an appropriate thickness of dense metal shielding, for example of lead, to ensure the safety of humans who are in close proximity to the water purifier. This embodiment is correspondingly heavy and less apt for portable applications, unless the unit is modestly scaled in size and throughput flow rate.

The foregoing objects and aspects are achieved in a biocidal water purification apparatus that uses exposure to nuclear radiation to eliminate viable species in water subjected to treatment. The nature of the radiation, namely beta particles, is relatively innocuous but is lethal to undesirable species at a sufficient incident energy level and at very close range. A housing forms a path for water to flow from an inlet to an outlet along a flow path through a treatment zone at which the water is subjected to radiation from a source of radiation, such as beta particles from a decaying nuclear isotope such as strontium-90 on the surfaces or near the surfaces (e.g., under a sealing layer) defining the water flow path. The energy of beta particles is attenuated over a relatively short traverse of air or water.

The level of exposure to radiation is maintained at an operative biocidal level by providing a narrow water flow path between plates having surfaces lined with the radioactive isotope. This can include oppositely interleaved plates with tapered or triangular cross sections, the surfaces of adjacent plates being preferably parallel and spaced by about 0.25 inch (0.1 to 0.4 inch) to produce an elongated zigzag path traversed by the water, for example by vertical gravity feed. Additional aspects include other forms of radiation and pre- and post-treatment water treatment or filtration stages.

BRIEF DESCRIPTION OF THE DRAWINGS

The foregoing aspects and objects, as well as additional variations and benefits, will be apparent from the following discussion of preferred embodiments and examples, with reference to the accompanying drawings, wherein.

DETAILED DESCRIPTION OF EXEMPLARY EMBODIMENTS

A water purification device is disclosed herein for use in providing potable water for various end uses. In certain embodiments, the device can be portable and the water throughput gravity powered, although larger capacity pump driven arrangements are possible as well. The water purification device is useful, for example in scenarios including but not limited to military field operations, in cases of terroristic biological attacks, or perhaps merely flooding, resulting in the compromise of treated water sources, rescue operations where available water is otherwise untreated and potentially is contaminated, and human habitations that lack operating water treatment facilities.

According to one aspect, the water purification device comprises a radioactive isotope that emits beta particles ($\beta^-$). The isotope carried by a plurality of closely spaced interleaved plates. The plates are arranged to define a wide but thin flow path for treatment water flowing between the plates. Advantageously, the spacing between adjacent plates is less than or approximately equal to the typical trajectory distance of a beta particle in water. Thus, a substantial proportion of the beta particles emitted into the water from the plates retain sufficient energy to ionize and degrade biological tissues in the water, before the energy of beta particles is dissipated and the particles become merely free electrons.

The targeted biological species are those that may be harmful or irritating to humans who ingest or come into contact with the water. Without limitation, targeted entities include parasites, bacteria, algae, viruses, fungi, their reproductive elements such as pollen and spores, fragments of such entities and elements including tissues and proteins, excreted products of such entities, and generally all tissues and byproducts of any living microbe or species to which the water has been exposed.

The exposure of entities in the water to beta particles or other ionizing radiation is a function of the energy density of incident beta particles and the residence time of the water in the device. The energy density of beta particles produced by the beta emitting isotope is maximized by locating the beta emitting isotope very close to the flowing water, specifically by providing a flow path that is very thin and bounded by wide beta emitting plate surfaces. The flow of water is driven by gravity subject to the flow resistance of a narrow flow path over a linear length that passes in a zigzag pattern over and between successive beta emitting plates. In an exemplary embodiment, the biocidal stage of the unit, within a volume of about 2,900 cubic inches (8 by 18 by 20 inches) houses 25 beta energized strontium-90 titanate plates. The plates define about 5,400 square inches of active surface area on opposite faces of a flowpath that is 0.25 inches thick and about 440 inches long.

Given the planar geometry of the radiation source, the key parameters affecting the dose are the density of source per unit of plate area or Curies/cm$^2$, and the thickness of the liner material. The liner material must not degrade because of radiation damage, which rules out some substances such as organics (e.g., plastics). A preferred thickness is less than 1 mm. The areal radiation density is also dependent on the specific activity of the source material. Pure strontium-90 has a specific activity of around 150 Curies/gram. Available specific activities for strontium-90 range from 20 to 40 Curies/gram. The integrated dose of radiation is dependent upon the activity level of the beta source (number of curies/gram), total quantity (grams) of the source, and the residence time in the unit. The required dose may be between 1 and 5 Megarads depending on the type and quantity of organisms in the untreated water.

Figure 1:
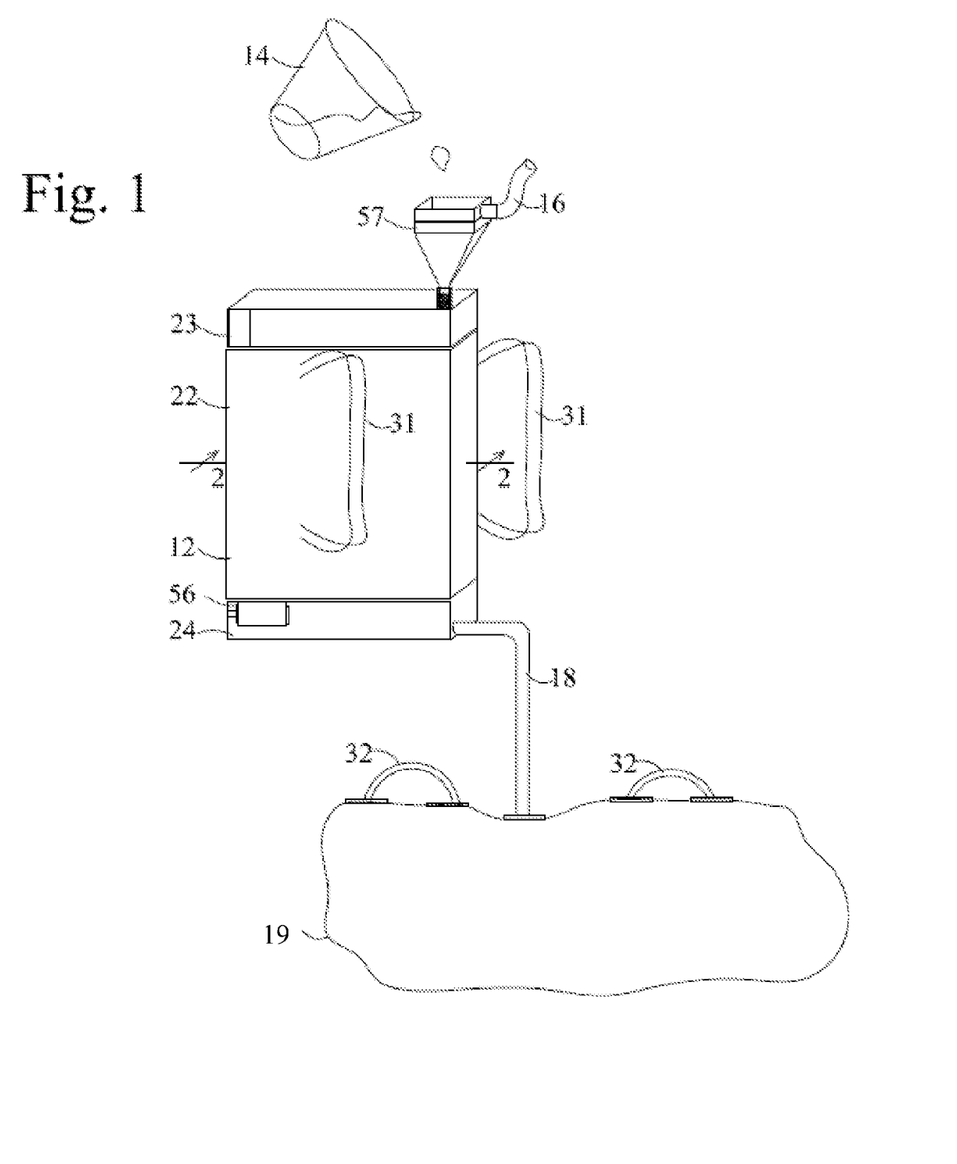
FIG. 1 is a schematic external perspective view of an exemplary embodiment of a water purification system with features as discussed.

FIGS. 1-7 are a series of views demonstrating an exemplary embodiment of a water purification system with features as discussed herein. Referring to FIG. 1, a portable water purification system 12 is fed from a water source 14 (shown generally) and provides a gravity powered water flow path from funnel 57 at an inlet 16 to an outlet 18 that is coupled to a collection reservoir such as a water-inflatable bladder 19 from which treated water may be dispensed. One or more 36 gallon flexible plastic containers are appropriate for use as collection receptacles. A funnel 57 is useful for filling device 12 in such a way as to maintain constant head pressure when operating in a batch fill mode.

Either batch flow or a continuous flow operation is possible. In a continuous fill mode, it is advantageous to obtain a relatively constant pressure head and constant flow to ensure that an even and proper dose is applied to the water flowing through the device. Item 56 is constant flow throttle valve that limits the rate of flow of water out of device 12, such that the beta dosage applied to the water is approximately the same for water throughout the device operation.

In a batch or start-up mode, the unit can be filled with water while outlet flow is obstructed by the valve. In that case, water is retained in the unit while subject to beta particle radiation. After a predetermined time, the valve is opened to allow the water to pass through the unit by the force of gravity. The radioactive treatment is accomplished at a biocidal treatment unit 22 disposed along the water flow path between a pretreatment unit 23 at the top of the water purification system 12 that removes suspended solids, and a post treatment unit 24 ("post" treatment meaning downstream of the biocidal treatment unit 22), while flow control of water is maintained by valve 56.

The pretreatment unit 23 can contain any of various initial water treatment arrangements. Assuming that the raw water may be turbid, for example, the pretreatment unit 23 can include a pretreatment filtration stage configured to remove solids. For this purpose, the pretreatment unit can include one or more of a sedimentation screen 57, a media filter, and a porous barrier filter. Other pretreatments are possible such as a skimmer for eliminating foam or floating material, with or without application of flocculants to assist in clarifying the water. The biocidal unit 22 applies ionizing radiation to degrade biological species as discussed herein in detail. The next treatment unit after the biocidal stage can be a post treatment filtration stage that advantageously includes an absorptive material such as activated charcoal, which is useful for eliminating volatile fractions of the treatment water. Certain activated charcoal filters will also remove heavy metals. Suitable provisions for pretreatment and post treatment stage elements such as filters 23 and 24 with pads of fiber, media filters with flushable media, fused or loose activated charcoal particles and the like are generally available in connection with small scale water purification systems such as under-sink installations, water softener facilities, etc.

The pretreatment and post treatment units 23 and 24 require periodic service, for example flushing in the case of the pretreatment unit to remove accumulated sediment or skimmed flotsam, and processing or replacement of activated charcoal in the post treatment unit. For ease of access, the pre and post treatment units can include slide-out drawers or cartridges (not shown in FIG. 1). In an example, the water purification system can include two or more sets of such drawers or cartridges enabling one set to be deployed while the other set is being cleaned.

The water purification system as a whole is preferably portable such that a single person can carry the system using backpack straps 31. The connecting lines for inlet 16 and outlet 18 preferably comprise flexible plastic tubing. Handholds 32 in the collection bladder 19 facilitate manipulation of the bladder 19, typically when empty or nearly empty of water.

Figure 2:
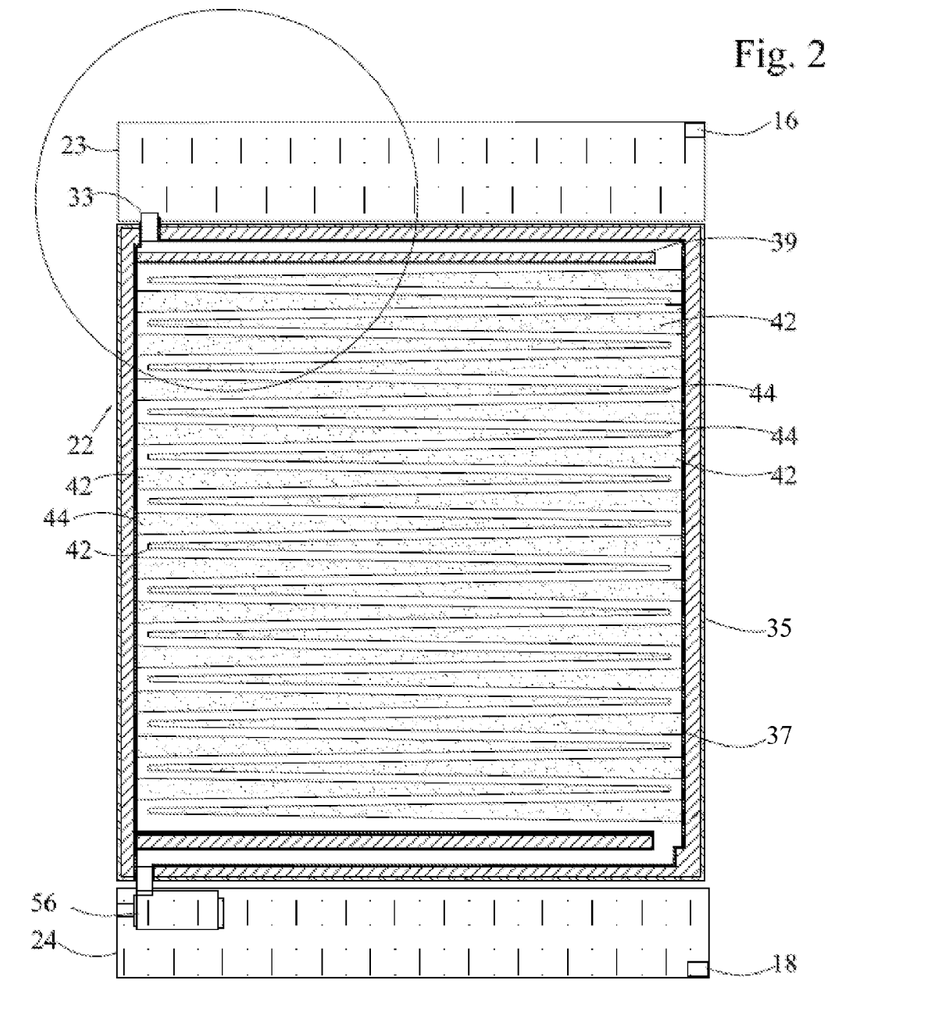
FIG. 2 is a cross-section along line 2-2 in FIG. 1, namely a cross-section along a lateral plane through the water purification system from the front.

FIG. 2 is a section view that generally shows the slide out sedimentation and clarification unit 23 (optionally with chemical clarification aspects) and the slide out post treatment odor and filtration unit 24. The circle in FIG. 2 identifies an area of detail shown in FIG. 3. The inlet 16 and outlet 18 each can include a 0.75 inch snap-connector for 0.75 inch clear flexible plastic tubing. The inlet can be connected to any suitable raw water source, ranging from an outdoor watercourse to a potentially compromised indoor well system or municipal water main to a siphon connection to a cistern or swimming pool and conveying water to inlet 57. The outlet is shown connected to collection bladder 19 but also could terminate at a hosed end valve (not shown) on outlet line 18.

Figure 3:
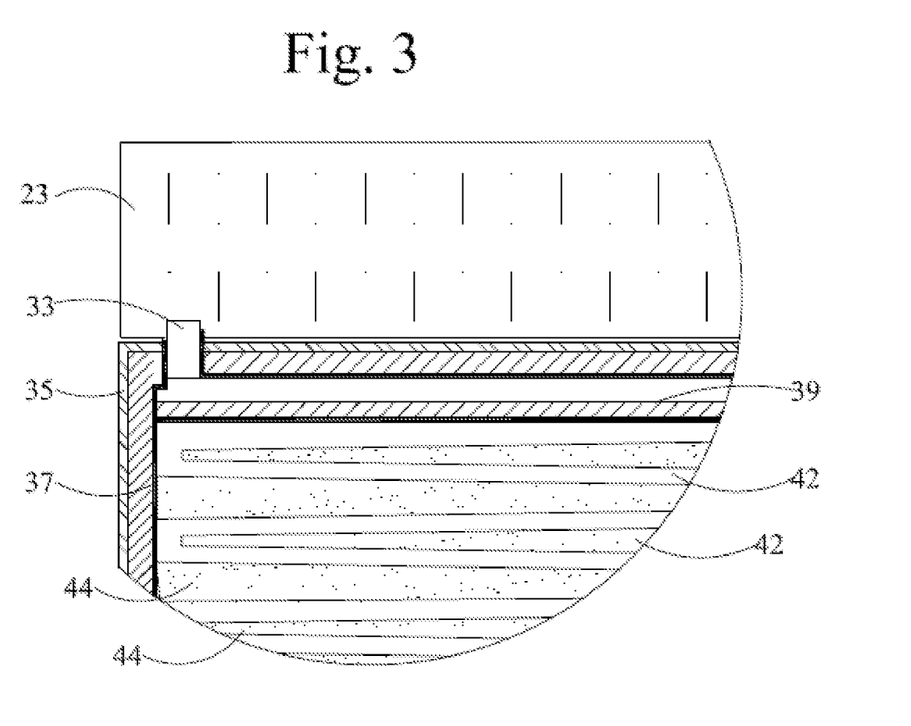
FIG. 3 is a detail section view in the area of circle 3 in FIG. 2.

FIGS. 2 and 3 show that the coupling from the pretreatment stage to the biocidal stage is made at a drop inlet fitting 33 from which water flows onto an upper barrier plate 39 at the top of a two layer enclosure. The enclosure in this embodiment has an outer enclosure 35, for example of sheet steel 0.13 inches thick, and an inner conductive enclosure 37, for example of 0.04 inch conducting copper or aluminum sheet metal. The enclosure is thus shielded to an extent that may be appropriate for beta particle radiation. In a more radioactively powerful gamma ray embodiment, all or part of the enclosure can be encased in lead shielding, represented in FIGS. 2 and 3 by a metal plate 39 disposed over the top of the biocidal treatment stage. In a gamma ray embodiment, this and similar shielding on the enclosure may comprise 6 inch lead shielding.

The left end of upper plate 39 shown in FIG. 2 is attached to the inside sheet metal enclosure 37 and although not shown in this cross section, plate 39 is also attached to the sheet metal enclosure 37 on the front and rear. But a gap is left open between the plate 39 and the inside of the enclosure 37 on the right end of upper plate 37. Accordingly, water flowing into the biocidal element 22 flows to the end of the housing (to the right in FIG. 2) before dropping down one level to the uppermost beta emitting plate of a succession of plates 42 that are attached on the inside of the enclosure 37 on the right side, and are interleaved with a succession of plates 44 that are attached on the inside of the enclosure 37 on the left side. The interleaved plates 42, 44 are tapered or triangular in cross section, being thicker on the attached end shown in FIG. 2 and thinner at a free end spaced from the inside of the enclosure. (The plates 42, 44 are also attached to the sheet metal enclosure at the front and rear, although not shown in this cross section.)

The plates 42, 44 are mounted horizontally and can be positioned using spacers (not show) during assembly. The taper of the horizontally plates 42, 44 is such that the upper surface of each plate 42, 44 is sloped downwardly from its attached end toward its free end. The water flowing downward by force of gravity flows over the face of each plate 42 or 44 from its thicker attached end to its thinner free end and drops down to the next lower plate 44 or 42, respectively.

Figure 4:
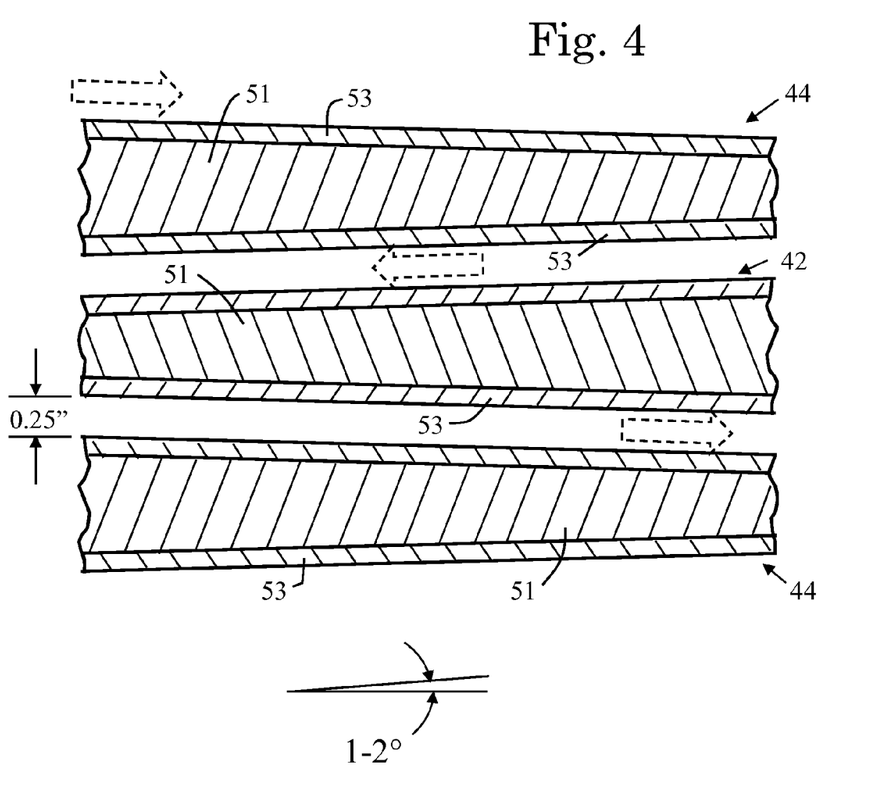
FIG. 4 is an enlarged view showing the path of treatment water along beta emitter plates shown in FIG. 3.

Referring also to FIG. 4, the water (dashed line arrows) flows in a zigzag path from left to right proceeding vertically downward by force of gravity. Advantageously, the slope of the plate surfaces is minimal, e.g., two degrees or less, and as a result, the water flows slowly. As another result, the individual plates 42, 44 are thin and a large number of plates can be fit into a small volume. In the illustrated embodiment, twenty five plates 42, 44 are accommodated in less than nineteen inches of vertical height.

The successive plates 42, 44 are arranged such that the underside of each plate 42 or 44 is parallel to the upper side of the next lower plate. For most efficient use of the beta particle radiation, which can traverse only a short distance in air or water, the plates 42, 44 are spaced closely, preferably less than the distance traversed by beta particles resulting from nearby nuclear decay, before the particles energy dissipates. In one example, the spacing between the faces of successive plates is about 0.25 inch measured vertically. It is possible to use a range of spacing from 0.1 to 0.5 inches with similar effect. If the spacing is greater in that range, less total active surface area can be fit into the same volume. If the plates are spaced such that the passageway is very thin, local surface features and the surface tension of water may impede flow.

When water is introduced into the drop inlet 33, for example as a continuous flow, the water flows downwardly through the biocidal treatment zone within unit 22, residing under the influence of the beta particle radiation from an immediately adjacent beta emitting source for a time of 30 to 60 seconds. The water flowing through unit 22 and any biota that are entrained, receive a fatal and preferably also a physically degrading dose of ionizing radiation sufficient to damage the structure of their plasmids and proteins. The flow path is structured and dimensioned to minimize the range between the beta emitting source and to maximize the resident time of water in the biocidal zone. The unit is apt as a portable unit (represented by the backpack straps shown for carrying the unit) but also can be scaled up in the case of a higher desired throughput, or scaled down if a modest through put is adequate. The illustrated embodiment can produce a flow rate averaging about 0.5 liters per minute.

The housing of the water purification unit is conveniently rectilinear as shown, and the beta source isotope is carried on individual interleaved plates. The beta source isotope (e.g., strontium-90) can be isolated from contact with the flowing water by a coating layer of aluminum, silver or copper over the isotope. Silver and copper, particularly, further contribute to the biocidal process.

Figure 5:
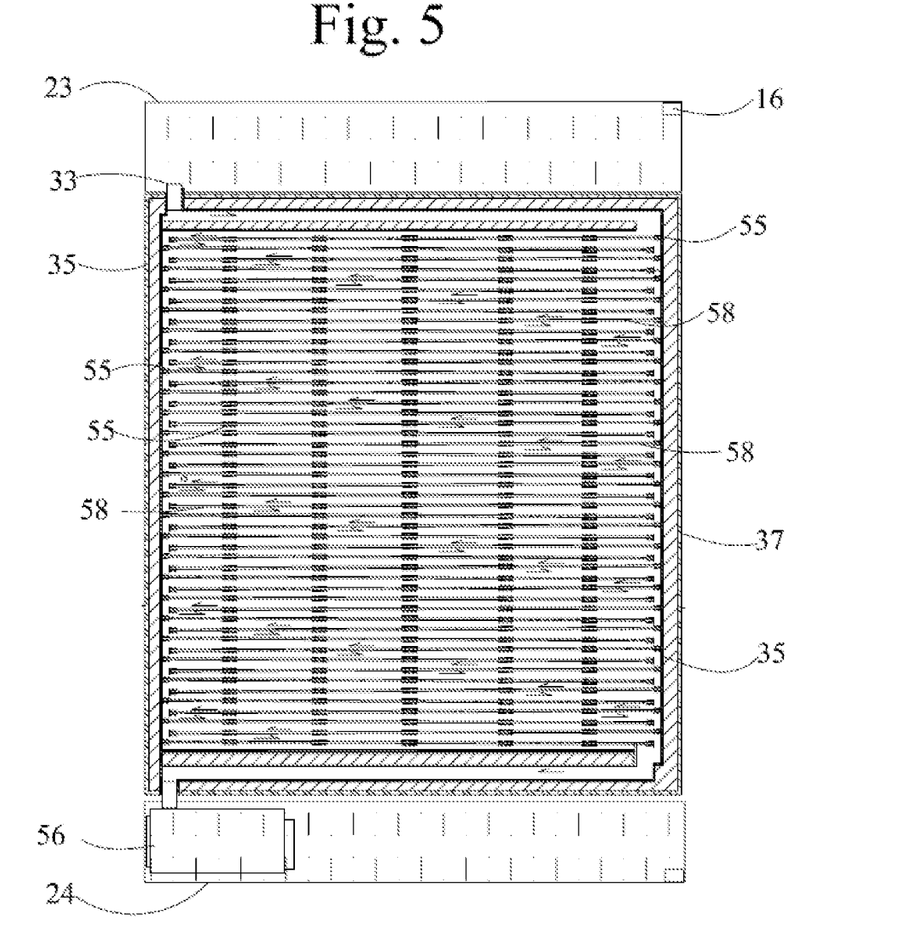
FIG. 5 is a sectional view along line 1-1 of device using an alternate emitter plate whereby the water comes in direct contact with the plate.

Aluminum, silver or copper can be provided as the inner layer of the enclosure in contact with the treatment water when using beta particle radiation. Although effective as an ionizing radiation, beta particles have a short travel range, particularly through metals. Thus, relatively thin shielding, particularly if embodied with inner and outer sheet metal shells as shown, substantially eliminates radiation hazard to humans near the water treatment unit. In an embodiment provided with a radio isotope emitting heavy particle radiation, such as gamma particles from radioactive decay of cobalt or cesium isotopes, the housing should be surrounded by lead with steel on the outside to shield humans from the radiation hazard. The lead captures incident gamma rays, but might advantageously be made up to six inches thick. Embodiments requiring such shielding are generally not man-portable, due to the considerable weight of effective gamma ray shielding. However in a man-portable embodiment using a radio isotope that produces beta radiation (such as strontium-90), a metal enclosure a few millimeters thick is sufficient to attenuate the energy of beta particles (high energy electrons An advantageous source is strontium-90 ($^{90}$Sr), which is a product of nuclear fission. For embodiment as tapered plates 42, 44, the source can be strontium titanate encased in a thin isolating plating, e.g., 0.038 inch thick aluminum, silver or copper plating. FIG. 5 illustrates and embodiment wherein a beta emitter plate 58 is only partly encased between grid-shaped lattices 55 for structural support thus allowing the water to come in direct contact with the beta source. (See also the section view in FIG. 6.) In another alternative, the strontium-90 can be encased in a thin polymer coating. Strontium titanate is an oxide of strontium and titanium with the chemical formula $SrTiO_3$.

Figure 6:
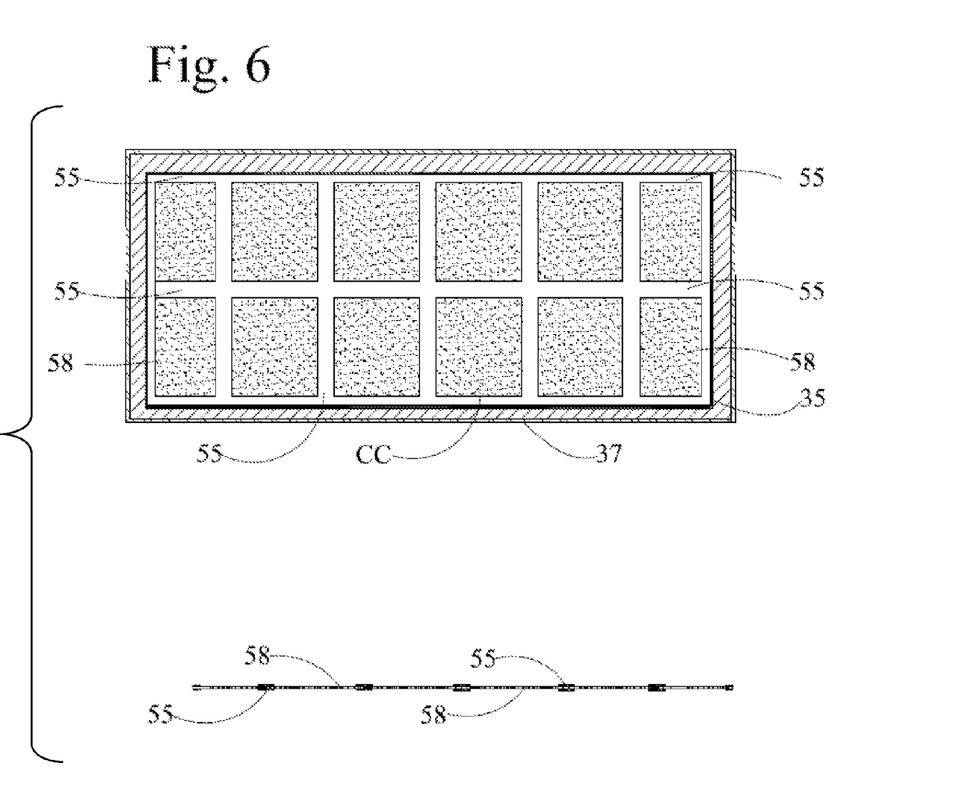
FIG. 6 is a sectional view along line 2-2 of device described in FIG. 5.
Figure 7:
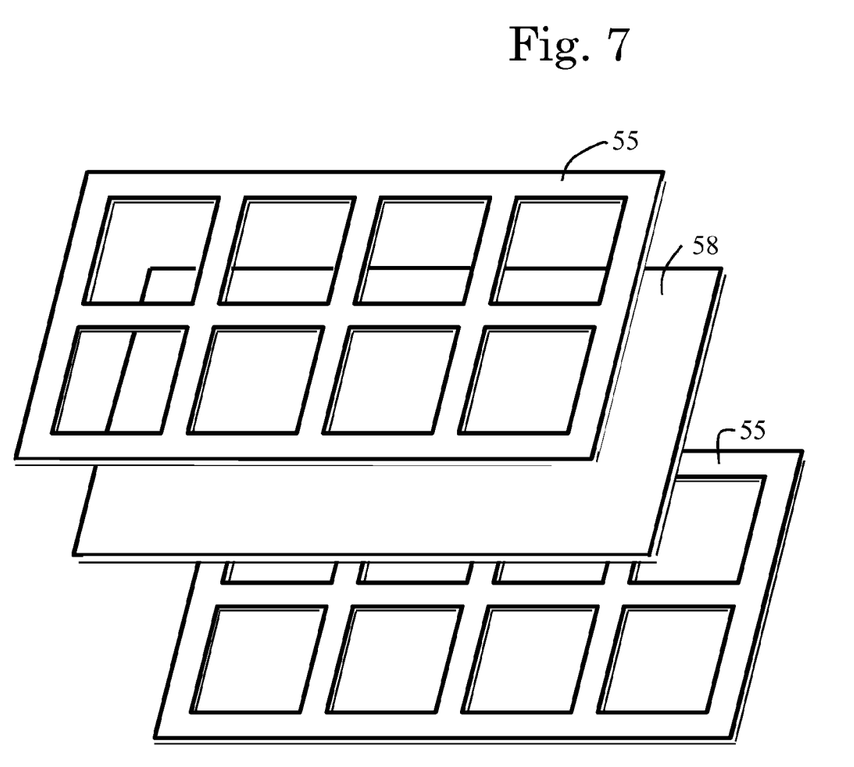
FIG. 7 is an exploded perspective of an alternative embodiment for a beta emitter plate.

FIGS. 5, 6 and 7 illustrate an alternate method of having water course through the system. The plate comprises strontium titanate in a crystalline form of beta-emitting $^{90}$Sr that is not water soluble. In this embodiment, the plate does not need to be encased. The plate is self-supporting; however, to make it structurally rigorous, for example for combat use and durable portability, a wide grid support of aluminum or copper is attached to the inner casing. FIG. 5 is a section showing the plates 58 in a tight pattern and in a slight angle so water can flow by gravity. FIG. 6 is a section through FIG. 5, showing one plate and the support grid system 55, with a section through one plate shown below that. FIG. 7 is an isometric view of one plate 58 and two support grids 52, one above the plate 58 and one below. An advantage is that the water flows directly over the $^{90}$Sr material, thereby receiving a maximum dosage at the exposed part of the plate. This arrangement allows use of 50 plates in the system, enabling an increased flow rate (liters/hour) of sterilized water compared to encased $^{90}$Sr.

$^{90}$Sr undergoes $\beta^-$ decay with a half-life of 28.79 years and a decay energy of 0.546 MeV distributed to an electron, an anti-neutrino, and the daughter isotope, yttrium ($^{90}$Y), which in turn undergoes $\beta^-$ decay with half-life of 64 hours and decay energy 2.28 MeV distributed to an electron, an anti-neutrino, and $^{90}$Zr (zirconium), which is stable. Unlike gamma ray sources, beta particles are emitted with a distribution of energies because the decay energy is shared by the neutrino and the beta particle. Thus for Y-90 2.28 MeV is the maximum energy and 0 MeV is minimum. $^{90}$Sr/$^{90}$Y is almost a pure beta particle source. The gamma photon emission from the decay of $^{90}$Y is so infrequent that it can normally be ignored. Accordingly, strontium-90 is useful as a biocidal beta particle source in connection with water treatment. However bremsstrahlung radiation is an important concern in designing the external shielding.

According to certain embodiments and aspects of this disclosure, a water treatment system is provided to treat water that may contain undesirable living species or infectious biologicals that are to be rendered non-viable such as bacteria, viruses, fungi or their spores or precursors. The treatment can also be used to degrade particles that may be undesirable if not viable such as proteins or plasmids that may produce allergic and/or immunologic reactions. The object is to produce dependably safe potable water. What is needed is a sufficiently powerful source of ionizing radiation applied to the water over a sufficient period of time. The techniques disclosed herein maximize the effective application of radiation from a source in a water treatment apparatus, while shielding the space outside of the apparatus from radiation hazard.

In order to insure that a biocidal dose is applied, a timer or clock can be provided or built into the unit so that the exit valve is not opened until a predetermined exposure time has elapsed from the start of a batch fill. In that case, the exit valve is closed before pouring water into the device, and opened only after the required time has elapsed. The exposure time needed depends on the radiation density, exposure time, etc., as described above.

For these purposes, a housing is arranged to form a path for water caused at least intermittently to flow from an inlet to an outlet along a flow path. At least a portion of the flow path defines a treatment zone at which the water is subjected to radiation from a source of radiation. The water passing through the water treatment zone is subject to radiation from the source of radiation at a power level, concentration and exposure time that have a biocidal effect on at least one specie in the water. In exemplary advantageous embodiments, the radiation comprises high energy electrons incident on the flow path, i.e., beta particles.

Water from sources as described above can be poured or piped into the top of the water purification system 12. As this water flows slowly through the water purification system, the biological contaminants are neutralized by the beta particles. The potable water is discharged from the bottom, for example into storage containers such as the illustrated bladder. In the embodiments as described, the water purification system does not rely on electrical or mechanical power to operate. Water is fed through the device by gravity and the active biocidal isotopes continue due to nuclear fission to emit beta particles over a period of years.

Any tubes and connections required to operate the water purification system are advantageously snap fittings. Multiple water purification systems as described units can be connected in parallel to increase the rate of throughput of treated water. The water purification system or its elements such as the biocidal treatment stage can be used in various configurations and used as elements of other water treatment apparatus, perhaps with other pre or post treatment stage facilities or perhaps where the water treatment mission is limited to neutralized a known biological agent.

The overall device can be scaled so as to be portable, e.g., weighing 75 lbs. or less. A nominal water throughput rate is 33 liters per hour (approximately 8.5 gal/hr.) The geometry of the unit can be changed to fit a particular use or site.

The device has been disclosed in connection with illustrative embodiments and examples of its structures and functions. The invention is not limited only to the embodiments disclosed as examples and is capable of variations within the scope of the disclosure. Reference should be made to the appended claims rather than the description of examples to assess the scope of the invention in which exclusive rights are claimed.

What is claimed is:

1. A water treatment system for water that can contain undesirable living species, comprising: a housing forming a path for water caused at least intermittently to flow from an inlet to an outlet along a flow path; wherein at least a portion of the flow path defines a treatment zone at which the water is subjected to radiation from a source of radiation; wherein water passing through the water treatment zone is subject to radiation from the source of radiation at a power level, concentration and exposure time that have a biocidal effect on at least one specie in the water; wherein the radiation comprises high energy electrons incident on the flow path; and wherein the radiation comprises beta particles produced by decay of a nuclear isotope.

2. The water treatment system of claim 1, wherein the nuclear isotope comprises strontium-90.

3. The water treatment system of claim 1, wherein the nuclear isotope comprises strontium-90 in a chemical form of strontium titanate lining the flow path in the water treatment zone.

4. The water treatment system of claim 1, wherein the nuclear isotope resides along the flow path and is separated by the flow path by a protective layer that is substantially transparent to the beta particles.

5. The water treatment system of claim 1, wherein the flow path is defined between surfaces of plates carrying the nuclear isotope.

6. The water treatment system of claim 5, wherein the plates comprise a succession of oppositely interleaved spaced plates, each of the plates having a fixed end attached one of the walls and a free end extending toward an opposite one of the walls, wherein the water flow path in the treatment zone passes in a zigzag pattern between adjacent ones of the plates, around a free end and then between next adjacent ones of the plates.

7. The water treatment system of claim 6, wherein the plates are triangular in cross section.

8. The water treatment system of claim 5, wherein the surfaces of adjacent plates are substantially parallel to one another at a predetermined space.

9. The water treatment system of claim 8, wherein the predetermined space is about 0.1 to 0.4 inches.

10. The water treatment system of claim 8, wherein the predetermined space is about 0.25 inches, the nuclear isotope comprises strontium-90 on adjacent said plates mounted on laterally opposite walls of a housing, and the water flow is driven by gravity.

11. The water treatment system of claim 1, further comprising external shielding surrounding at least part of the flow path.

12. The water treatment system of claim 11, wherein the external shielding includes an electrically conductive cabinet wall.

13. The water treatment system of claim 1, further comprising at least one of a pretreatment filtration stage preceding the treatment zone along the water flow path and a post treatment filtration stage.

14. The water treatment system of claim 1, comprising a pretreatment filtration stage preceding the treatment zone along the water flow path, wherein the pretreatment filtration stage is configured to remove suspended solids and includes at least one of a sedimentation weir, a media filter, and a porous barrier filter.

15. The water treatment system of claim 1, comprising a post treatment filtration stage following the treatment zone along the water flow path, wherein the post treatment stage exposes the water to an absorptive material.

16. The water treatment system of claim 15, wherein the absorptive material comprises activated charcoal.

17. A water treatment system for water that can contain undesirable living species, comprising: a housing forming a path for water caused at least intermittently to flow from an inlet to an outlet along a flow path; wherein at least a portion of the flow path defines a treatment zone at which the water is subjected to radiation from a source of radiation; wherein water passing through the water treatment zone is subject to radiation from the source of radiation at a power level, concentration and exposure time that have a biocidal effect on at least one specie in the water, wherein the radiation comprises gamma radiation produced by decay of a radioactive isotope, and further comprising a radiation shielding enclosure at least partly surrounding the treatment zone.

18. The water treatment system of claim 17, wherein the flow path is defined between surfaces of plates carrying the radioactive isotope.

19. The water treatment system of claim 18, wherein the plates comprise a succession of oppositely interleaved spaced plates, each of the plates having a fixed end attached one of the walls and a free end extending toward an opposite one of the walls, wherein the water flow path in the treatment zone passes in a zigzag pattern between adjacent ones of the plates, around a free end and then between next adjacent ones of the plates.

20. The water treatment system of claim 19, wherein the plates are triangular in cross-section.

\* \* \* \* \*